United States Patent
Pittaluga et al.

(10) Patent No.: US 12,462,057 B2
(45) Date of Patent: Nov. 4, 2025

(54) IMAGE FEATURE MATCHING WITH FORMAL PRIVACY GUARANTEES

(71) Applicant: NEC Laboratories America, Inc., Princeton, NJ (US)

(72) Inventors: Francesco Pittaluga, Los Angeles, CA (US); Bingbing Zhuang, Santa Clara, CA (US); Xiang Yu, Mountain View, CA (US)

(73) Assignee: NEC Corporation, Tokyo (JP)

( * ) Notice: Subject to any disclaimer, the term of this patent is extended or adjusted under 35 U.S.C. 154(b) by 70 days.

(21) Appl. No.: 18/598,198

(22) Filed: Mar. 7, 2024

(65) Prior Publication Data

US 2024/0303365 A1 Sep. 12, 2024

Related U.S. Application Data

(60) Provisional application No. 63/460,051, filed on Apr. 18, 2023, provisional application No. 63/460,049, filed on Apr. 18, 2023, provisional application No. 63/460,052, filed on Apr. 18, 2023, provisional application No. 63/488,813, filed on Mar. 7, 2023.

(51) Int. Cl.
  *G06F 21/62* (2013.01)
  *G06V 10/75* (2022.01)

(52) U.S. Cl.
  CPC ........ *G06F 21/6227* (2013.01); *G06V 10/751* (2022.01)

(58) Field of Classification Search
  CPC ........................... G06F 21/6227; G06V 10/751
  USPC .......................................................... 726/27
  See application file for complete search history.

(56) References Cited

U.S. PATENT DOCUMENTS

| | | | | |
|---|---|---|---|---|
| 9,043,250 | B2 * | 5/2015 | Ling | G06F 21/6254 703/2 |
| 2013/0163874 | A1 * | 6/2013 | Shechtman | G06V 10/757 382/190 |
| 2020/0394320 | A1 * | 12/2020 | Bernau | G06N 3/047 |
| 2022/0327438 | A1 * | 10/2022 | Bach | G06K 7/10297 |

(Continued)

OTHER PUBLICATIONS

Zhou, B., Lapedriza, A., Khosla, A., Oliva, A., & Torralba, A. (Jul. 4, 2017). Places: A 10 million image database for scene recognition. IEEE transactions on pattern analysis and machine intelligence, 40(6), 1452-1464.

(Continued)

*Primary Examiner* — Benjamin R Bruckart
(74) *Attorney, Agent, or Firm* — Joseph Kolodka; Vincent Duffy

(57) ABSTRACT

Systems and methods are provided for privacy-preserving image feature matching in computer vision applications, including receiving a raw image descriptor, and perturbing the raw image descriptor using a subset selection mechanism to generate a perturbed descriptor set that includes the raw image descriptor and additional descriptors. Each descriptor in the perturbed descriptor set is replaced with its nearest neighbor in a predefined descriptor database to reduce the output domain size of the subset selection mechanism. Local differential privacy (LDP) protocols are employed to further perturb the descriptor set, ensuring formal privacy guarantees, and the perturbed descriptor set is matched against a second set of descriptors for image feature matching.

20 Claims, 8 Drawing Sheets

(56) References Cited

U.S. PATENT DOCUMENTS

2023/0058906 A1* 2/2023 Jansen ................ G06F 21/6254

OTHER PUBLICATIONS

Nister, D., & Stewenius, H. (Jun. 17. 2006). Scalable recognition with a vocabulary tree. In 2006 IEEE Computer Society Conference on Computer Vision and Pattern Recognition (CVPR'06) (vol. 2, pp. 2161-2168). Ieee.
Wu, Z., Wang, Z., Wang, Z., & Jin, H. (Sep. 8, 2018). Towards privacy-preserving visual recognition via adversarial training: A pilot study. In Proceedings of the European conference on computer vision (ECCV) (pp. 606-624).
The Visual Localization Benchmark. https://www.visuallocalization.net (Retrieved on Mar. 4, 2024).
Agarwal, S., Furukawa, Y., Snavely, N., Simon, I., Curless, B., Seitz, S. M., & Szeliski, R. (Oct. 1, 2011). Building rome in a day. Communications of the ACM, 54(10), 105-112.
Balntas, V., Riba, E., Ponsa, D., & Mikolajczyk, K. (Sep. 19, 2016). Learning local feature descriptors with triplets and shallow convolutional neural networks. In Bmvc (vol. 1, No. 2, p. 3).
Bishop, C. M. (Aug. 17, 2006). Pattern recognition and machine learning. Springer google scholar, 2, 5-43.
Cai, Z., Xiong, Z., Xu, H., Wang, P., Li, W., & Pan, Y. (Jul. 13, 2021). Generative adversarial networks: A survey toward private and secure applications. ACM Computing Surveys (CSUR), 54(6), 1-38.
Calonder, M., Lepetit, V., Ozuysal, M., Trzcinski, T., Strecha, C., & Fua, P. (Nov. 15, 2011). BRIEF: Computing a local binary descriptor very fast. IEEE transactions on pattern analysis and machine intelligence, 34(7), 1281-1298.
Chelani, K., Kahl, F., & Sattler, T. (Jun 20, 2021). How privacy-preserving are line clouds? recovering scene details from 3d lines. In Proceedings of the IEEE/CVF Conference on Computer Vision and Pattern Recognition (pp. 15668-15678).
Dalal, N., & Triggs, B. (Jun. 20, 2005). Histograms of oriented gradients for human detection. In 2005 IEEE computer society conference on computer vision and pattern recognition (CVPR'05) (vol. 1, pp. 886-893). Ieee.
Dosovitskiy, A., & Brox, T. (Dec. 5, 2016). Generating images with perceptual similarity metrics based on deep networks. Advances in neural information processing systems, 29.
Dosovitskiy, A., & Brox, T. (Jun. 26, 2016). Inverting visual representations with convolutional networks. In Proceedings of the IEEE conference on computer vision and pattern recognition (pp. 4829-4837).
Dusmanu, M., Schonberger, J. L., Sinha, S. N., & Pollefeys, M. (Jun. 19, 2021). Privacy-preserving image features via adversarial affine subspace embeddings. In Proceedings of the IEEE/CVF Conference on Computer Vision and Pattern Recognition (pp. 14267-14277).
Dwork, C. (Jul. 10, 2006). Differential privacy. In International colloquium on automata, languages, and programming (pp. 1-12). Berlin, Heidelberg: Springer Berlin Heidelberg.
Dwork, C., McSherry, F., Nissim, K., & Smith, A. (Mar. 4, 2006). Calibrating noise to sensitivity in private data analysis. In Theory of Cryptography: Third Theory of Cryptography Conference, TCC 2006, New York, NY, USA. Proceedings 3 (pp. 265-284). Springer Berlin Heidelberg.
Fischler, M. A., & Bolles, R. C. (Jun. 1, 1981). Random sample consensus: a paradigm for model fitting with applications to image analysis and automated cartography. Communications of the ACM, 24(6), 381-395.
Geppert, M., Larsson, V., Speciale, P., Schönberger, J. L., & Pollefeys, M. (Aug. 23, 2020). Privacy preserving structure-from-motion. In Computer Vision—ECCV 2020: 16th European Conference, Glasgow, UK, Proceedings, Part I 16 (pp. 333-350). Springer International Publishing.
Geppert, M., Larsson, V., Speciale, P., Schonberger, J. L., & Pollefeys, M. (Jun. 19, 2021). Privacy preserving localization and mapping from uncalibrated cameras. In Proceedings of the IEEE/CVF Conference on Computer Vision and Pattern Recognition (pp. 1809-1819).
Hartley, R., & Zisserman, A. (2003). Multiple view geometry in computer vision. Cambridge university press.
Hassan, M. U., Rehmani, M. H., & Chen, J. (Sep. 27, 2019). Differential privacy techniques for cyber physical systems: a survey. IEEE Communications Surveys & Tutorials, 22(1), 746-789.
He, K., Lu, Y., & Sclaroff, S. (Jun. 18, 2018). Local descriptors optimized for average precision. In Proceedings of the IEEE conference on computer vision and pattern recognition (pp. 596-605).
Hsu, J., Gaboardi, M., Haeberlen, A., Khanna, S., Narayan, A., Pierce, B. C., & Roth, A. (Jul. 19, 2014). Differential privacy: An economic method for choosing epsilon. In 2014 IEEE 27th Computer Security Foundations Symposium (pp. 398-410). IEEE.
Announcing Azure Spatial Anchors for Collaborative, Cross-Platform Mixed Reality Apps. https://azure.microsoft.com/en-us/blog/announcing-azure-spatial-anchors-for-collaborative-cross-platform-mixed-reality-apps/ (Feb. 25, 2019).
Kato, H., & Harada, T. (Jun. 23, 2014). Image reconstruction from bag-of-visual-words. In Proceedings of the IEEE conference on computer vision and pattern recognition (pp. 955-962).
Li, Z., & Snavely, N. (Jun. 18, 2018). Megadepth: Learning single-view depth prediction from internet photos. In Proceedings of the IEEE conference on computer vision and pattern recognition (pp. 2041-2050).
Long, J., Shelhamer, E., & Darrell, T. (Jun. 8, 2015). Fully convolutional networks for semantic segmentation. In Proceedings of the IEEE conference on computer vision and pattern recognition (pp. 3431-3440).
Lowe, D. G. (Jan. 5, 2004). Distinctive image features from scale-invariant keypoints. International journal of computer vision, 60, 91-110.
Mahendran, A., & Vedaldi, A. (Jun. 8, 2015). Understanding deep image representations by inverting them. In Proceedings of the IEEE conference on computer vision and pattern recognition (pp. 5188-5196).
McPherson, R., Shokri, R., & Shmatikov, V. (Sep. 6, 2016). Defeating image obfuscation with deep learning. arXiv preprint arXiv:1609.00408.
Mishchuk, A., Mishkin, D., Radenovic, F., & Matas, J. (Dec. 4, 2017). Working hard to know your neighbor's margins: Local descriptor learning loss. Advances in neural information processing systems, 30.
Ng, T., Kim, H. J., Lee, V. T., DeTone, D., Yang, T. Y., Shen, T., . . . & Sweeney, C. (Jun. 19, 2022). NinjaDesc: content-concealing visual descriptors via adversarial learning. In Proceedings of the IEEE/CVF Conference on Computer Vision and Pattern Recognition (pp. 12797-12807).
Pittaluga, F., Koppal, S., & Chakrabarti, A. (Jan. 7, 2019). Learning privacy preserving encodings through adversarial training. In 2019 IEEE Winter Conference on Applications of Computer Vision (WACV) (pp. 791-799). IEEE.
Pittaluga, F., Koppal, S. J., Kang, S. B., & Sinha, S. N. (Jun. 16, 2019). Revealing scenes by inverting structure from motion reconstructions. In Proceedings of the IEEE/CVF Conference on Computer Vision and Pattern Recognition (pp. 145-154).
Revaud, J., Almazán, J., Rezende, R. S., & Souza, C. R. D. (Oct. 27, 2019). Learning with average precision: Training image retrieval with a listwise loss. In Proceedings of the IEEE/CVF International Conference on Computer Vision (pp. 5107-5116).
Schonberger, J. L., & Frahm, J. M. (Jun. 26, 2016). Structure-from-motion revisited. In Proceedings of the IEEE conference on computer vision and pattern recognition (pp. 4104-4113).
Schonberger, J. L., Hardmeier, H., Sattler, T., & Pollefeys, M. (Jul. 21, 2017). Comparative evaluation of hand-crafted and learned local features. In Proceedings of the IEEE conference on computer vision and pattern recognition (pp. 1482-1491).
Shibuya, M., Sumikura, S., & Sakurada, K. (Aug. 23, 2020). Privacy preserving visual SLAM. In Computer Vision—ECCV

(56) References Cited

OTHER PUBLICATIONS

2020: 16th European Conference, Glasgow, UK, Proceedings, Part XXII 16 (pp. 102-118). Springer International Publishing.

Song, Z., Chen, W., Campbell, D., & Li, H. (Aug. 23, 2020). Deep novel view synthesis from colored 3D point clouds. In Computer Vision—ECCV 2020: 16th European Conference, Glasgow, UK, Proceedings, Part XXIV 16 (pp. 1-17). Springer International Publishing.

Speciale, P., Schonberger, J. L., Kang, S. B., Sinha, S. N., & Pollefeys, M. (Jun. 16, 2019). Privacy preserving image-based localization. In Proceedings of the IEEE/CVF Conference on Computer Vision and Pattern Recognition (pp. 5493-5503).

Speciale, P., Schonberger, J. L., Sinha, S. N., & Pollefeys, M. (Oct. 27, 2019). Privacy preserving image queries for camera localization. In Proceedings of the IEEE/CVF International Conference on Computer Vision (pp. 1486-1496).

Turk, M., & Pentland, A. (Jan. 1, 1991). Eigenfaces for recognition. Journal of cognitive neuroscience, 3(1), 71-86.

Vasiljevic, I., Chakrabarti, A., & Shakhnarovich, G. (May 30, 2017). Examining the impact of blur on recognition by convolutional networks. arXiv preprint arXiv:1611.05760.

Vondrick, C., Khosla, A., Malisiewicz, T., & Torralba, A. (Jun. 23, 2013). Hoggles: Visualizing object detection features. In Proceedings of the IEEE International Conference on Computer Vision (pp. 1-8).

Wu, Z., Wang, H., Wang, Z., Jin, H., & Wang, Z. (Sep. 28, 2020). Privacy-preserving deep action recognition: An adversarial learning framework and a new dataset. IEEE Transactions on Pattern Analysis and Machine Intelligence, 44(4), 2126-2139.

Wang, T., Blocki, J., Li, N., & Jha, S. (Aug. 16, 2017). Locally differentially private protocols for frequency estimation. In 26th USENIX Security Symposium (USENIX Security 17) (pp. 729-745).

Wang, T., Zhang, X., Feng, J., & Yang, X. (Dec. 8, 2020). A comprehensive survey on local differential privacy toward data statistics and analysis. Sensors, 20(24), 7030.

Weinzaepfel, P., Jégou, H., & Pérez, P. (Jun. 20, 2011). Reconstructing an image from its local descriptors. In CVPR 2011 (pp. 337-344). IEEE.

Xiao, T., Tsai, Y. H., Sohn, K., Chandraker, M., & Yang, M. H. (Apr. 3, 2020). Adversarial learning of privacy-preserving and task-oriented representations. In Proceedings of the AAAI Conference on Artificial Intelligence (vol. 34, No. 07, pp. 12434-12441).

Xiong, X., Liu, S., Li, D., Cai, Z., & Niu, X. (Oct. 8, 2020). A comprehensive survey on local differential privacy. Security and Communication Networks, 2020, 1-29.

Yang, M., Guo, T., Zhu, T., Tjuawinata, I., Zhao, J., & Lam, K. Y. (Dec. 30, 2023). Local differential privacy and its applications: A comprehensive survey. Computer Standards & Interfaces, 103827.

Yosinski, J., Clune, J., Nguyen, A., Fuchs, T., & Lipson, H. (Jun. 22, 2015). Understanding neural networks through deep visualization. arXiv preprint arXiv:1506.06579.

Zeiler, M. D., & Fergus, R. (Aug. 14, 2014). Visualizing and understanding convolutional networks. In Computer Vision—ECCV 2014: 13th European Conference, Zurich, Switzerland, Sep. 6-12, 2014, Proceedings, Part I 13 (pp. 818-833). Springer International Publishing.

\* cited by examiner

IMAGE FEATURE MATCHING WITH FORMAL PRIVACY GUARANTEES

RELATED APPLICATION INFORMATION

This application claims priority to Provisional Application Nos. 63/488,813, filed on Mar. 7, 2023; 63/460,051, filed on Apr. 18, 2023; 63/460,049, filed on Apr. 18, 2023; and 63/460,052, filed on Apr. 18, 2023, the contents of each of which are incorporated herein by reference in their entirety.

BACKGROUND

Technical Field

The present invention relates to enhancing privacy in digital image processing, and, more particularly to systems and methods for privacy-preserving image feature matching, providing formal privacy guarantees via local differential privacy (LDP) using descriptor perturbation and image matching.

Description of the Related Art

Many computer vision services require users to share raw feature descriptors with an untrusted server. This presents an inherent privacy risk as the raw descriptors may be used to recover the source images from which the descriptors were extracted. To address this issue, conventional systems and methods utilize various methods for generating private descriptor encodings. These methods are designed to convert a raw descriptor into a private encoding that cannot be used to recover the original descriptor, but can still be used for image matching. However, existing methods lack rigorous accounting of the privacy leakage and thus fail to provide any formal privacy guarantees, which has led to increased technological, societal, and governmental pressure to develop methods for privatizing descriptors that provide formal privacy guarantees.

The extraction and matching of image keypoints with descriptors are an important brick for most of the vision problems, such as 3D reconstruction, image retrieval, and recognition. Modern computer vision services often require the users to share feature descriptors, if not the raw images, to a centralized server for downstream tasks. However, high-quality images may be recovered from the keypoint descriptors or their localization information, which poses serious concerns on privacy leakage and potential inversion attack.

SUMMARY

According to an aspect of the present invention, a method is provided for privacy-preserving image feature matching in computer vision applications, including receiving a raw image descriptor, and perturbing the raw image descriptor using a subset selection mechanism to generate a perturbed descriptor set that includes the raw image descriptor and additional descriptors. Each descriptor in the perturbed descriptor set is replaced with its nearest neighbor in a predefined descriptor database to reduce the output domain size of the subset selection mechanism. Local differential privacy (LDP) protocols are employed to further perturb the descriptor set, ensuring formal privacy guarantees, and the perturbed descriptor set is matched against a second set of descriptors for image feature matching.

According to another aspect of the present invention, a system is provided for privacy-preserving image feature matching in computer vision applications. The system includes a processor operatively connected to a storage medium, and the processor is configured for receiving a raw image descriptor, and perturbing the raw image descriptor using a subset selection mechanism to generate a perturbed descriptor set that includes the raw image descriptor and additional descriptors. Each descriptor in the perturbed descriptor set is replaced with its nearest neighbor in a predefined descriptor database to reduce the output domain size of the subset selection mechanism. Local differential privacy (LDP) protocols are employed to further perturb the descriptor set, ensuring formal privacy guarantees, and the perturbed descriptor set is matched against a second set of descriptors for image feature matching.

According to another aspect of the present invention, a non-transitory computer-readable medium is provided for privacy-preserving image feature matching in computer vision applications, including receiving a raw image descriptor, and perturbing the raw image descriptor using a subset selection mechanism to generate a perturbed descriptor set that includes the raw image descriptor and additional descriptors. Each descriptor in the perturbed descriptor set is replaced with its nearest neighbor in a predefined descriptor database to reduce the output domain size of the subset selection mechanism. Local differential privacy (LDP) protocols are employed to further perturb the descriptor set, ensuring formal privacy guarantees, and the perturbed descriptor set is matched against a second set of descriptors for image feature matching.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
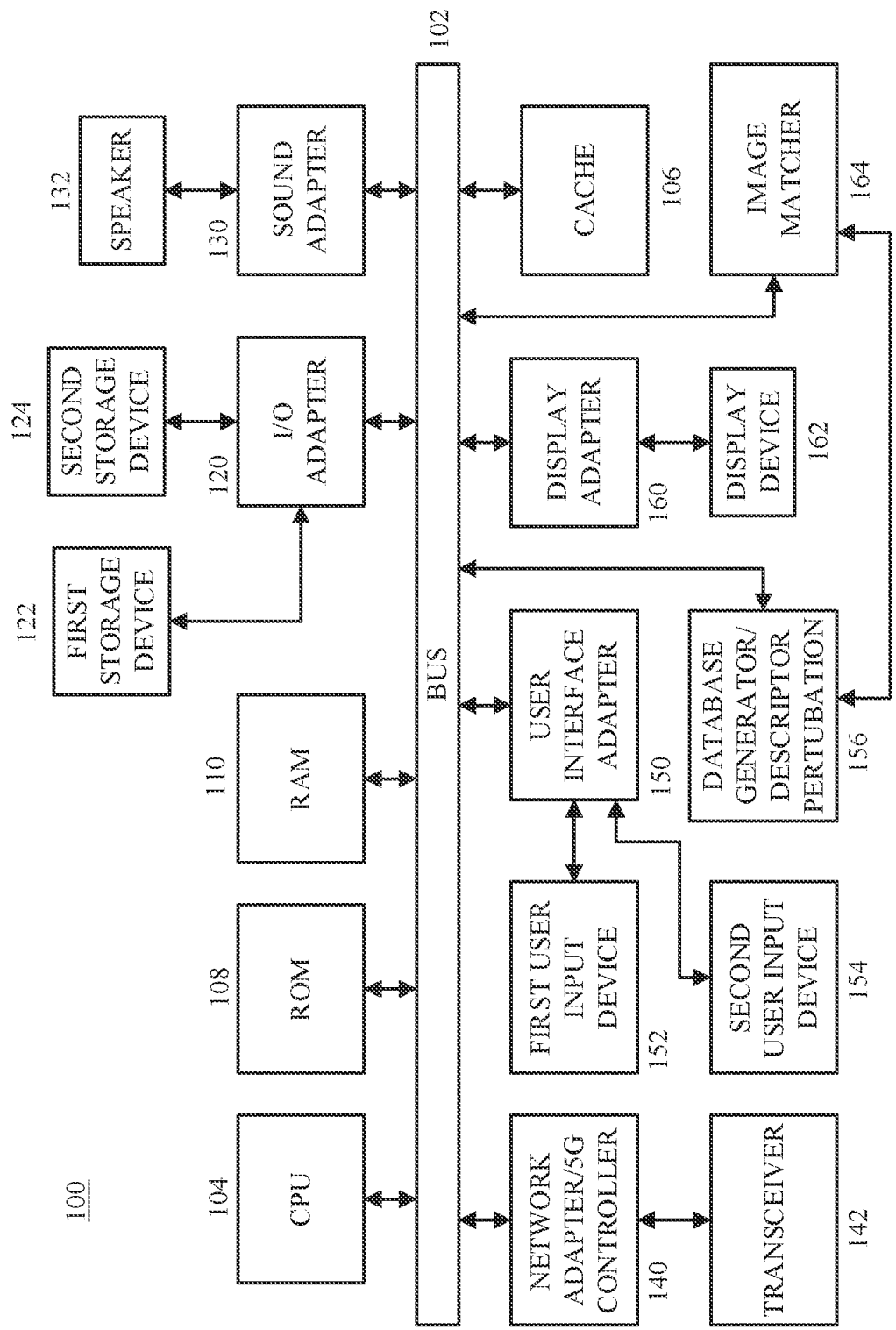
FIG. 1 is a block diagram illustratively depicting an exemplary processing system to which the present invention may be applied, in accordance with embodiments of the present invention.

In accordance with embodiments of the present invention, systems and methods are provided for image feature matching with formal privacy guarantees.

In various embodiments, the present invention, unlike conventional systems and methods, can provide formal privacy guarantees via local differential privacy (LDP). The method can include a descriptor perturbation step performed by users (e.g., owners of the images) and a matching step using perturbed descriptors. Since the perturbation step enables users to rigorously control the degree to which their descriptors are revealed, a downstream matching step can be performed by any entity, including an untrusted server, in accordance with aspects of the present invention.

The present invention relates to enhancing privacy in digital image processing, using systems and methods for privacy-preserving image feature matching. This can be achieved through a novel system and method that provides formal privacy guarantees via local differential privacy (LDP). The approach can include a descriptor perturbation step performed by users to rigorously control the degree to which their descriptors are revealed, and a matching step using these perturbed descriptors, which can be performed by any entity, including an untrusted server. This method addresses the inherent privacy risks associated with sharing raw feature descriptors with untrusted servers by ensuring that the perturbed descriptors cannot be used to recover the original images, thus offering a significant advancement in the state of the art for privacy-preserving image processing.

Image feature matching refers to a problem of matching keypoints and their associated descriptors (e.g., SIFT) across two images. Conventionally, this problem is broken down into two steps: photometric matching and geometric verification. Photometric matching identifies the pairs of descriptors across the two images that meet a specific matching criterion. Since this set often contains a large number of correct (inlier) and incorrect (outlier) matches, the random sample consensus algorithm (RANSAC), which is robust against outliers, can be employed for geometric verification (e.g., fundamental matrix fitting).

The present invention can utilize the subset selection mechanism to perturb (or privatize) descriptors in a manner that enables rigorous privacy accounting and high-quality image matching with minimal disruption to the conventional image matching pipeline described above. In some embodiments, prior to photometric matching, each descriptor can be perturbed by replacing it with a set of m descriptors which may or may not contain the original descriptor. Since each keypoint now has m descriptors associated with it, the perturbation can result in an increased number of outliers. However, since RANSAC can be employed for geometric verification and RANSAC is robust to outliers, image matching can still succeed in accordance with aspects of the present invention.

In some embodiments, comparatively strong privacy guarantees and matching performance can be achieved by limiting the output space of the subset selection mechanism. The privacy guarantees afforded by the subset selection mechanism are inversely proportional to the size of output domain of the mechanism. As such, naively setting the output space to the full descriptor domain (e.g., SIFT has a domain of size $2^{1024}$) does not lead to a desirable privacy-utility trade-off. To remedy this, prior to perturbation step, the present invention can first create a database of descriptors by extracting descriptors from a large public database of images and then performing clustering (e.g., k-means). Then, the output space of the subset selection mechanism can be set to be equal to the database and each of the descriptors to be perturbed can be replaced with its nearest neighbor in the database. Since each descriptor is replaced with its nearest neighbor, matching is minimally impacted and, importantly, the output domain of the subset selection mechanism can be dramatically reduced, so greater a greater privacy guarantee is achieved, in accordance with aspects of the present invention.

The present invention can include methods for photometric matching by computing pairwise distances between the descriptors from different images to identify pairs that meet a specific matching criterion. The photometric matches are then used to perform geometric verification. Geometric verification can involve using RANSAC to estimate the fundamental or essential matrix relating an image pair, from a set of photometric matches. Then, the photometric matches that are consistent with the estimated matrix are returned as geometrically verified matches.

In some embodiments, there can be firstly introduced two novel attacks against the adversarial affine subspace embedding, namely the database attack and the clustering attack. In database attack, the database used to sample the adversarial descriptors that lie on the affine subspace is accessible to the attacker, while in clustering attack it is not accessible. At its core, both attacks are established based upon the following key assumption: the low-dimensional (e.g. 2, 4, 8, etc.) affine subspace very likely only intersects with the manifold of high-dimensional (e.g. 128 for SIFT) descriptors at those points that were intentionally selected to construct the subspace in the beginning (e.g., the raw descriptor in question and the adversarial descriptors chosen from a database). As such, recovering the raw descriptor reduces to discovering all the subspace-manifold intersections and then eliminating the adversarial ones. The present invention can accurately be carried out in a straightforward manner if the database is accessible while limiting required processor usage requirements. In some embodiments, the present invention can leverage a self-established database to approximately identify the raw descriptor.

In some embodiments, the present invention can execute a feature privatization method that utilizes Local Differential Privacy (LDP). In contrast to differential privacy mechanisms which protect private information in the database from queries, this embodiment instead prevents privacy leakage in the query itself (e.g., the image descriptors to be sent). The present invention can formulate the local feature obfuscation through the lens of local differential privacy, with the so-called w-subset mechanism. This can effectively replace each raw descriptor with a random set of descriptors under predefined probability distribution, and thereby can benefit from the rigorous and quantifiable differential privacy guarantee. Furthermore, our application of LDP empirically yields strong privacy-trade of downstream tasks including visual localization and Structure-from-Motion, as shown in experimental results.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems, and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more database generators and/or descriptor perturbation devices 156 can be further coupled to system bus 102 by any appropriate connection system or method (e.g., Wi-Fi, wired, network adapter, etc.), in accordance with aspects of the present invention.

A first user input device 152 and a second user input device 154 are operatively coupled to system bus 102 by user interface adapter 150. The user input devices 152, 154 can be one or more of any of a keyboard, a mouse, a keypad, an image capture device, a motion sensing device, a microphone, a device incorporating the functionality of at least two of the preceding devices, and so forth. One or more video cameras 156 can be included, and the video cameras can include one or more storage devices, communication/networking devices (e.g., WiFi, 4G, 5G, Wired connectivity), hardware processors, etc., in accordance with aspects of the present invention. In various embodiments, other types of input devices can also be used, while maintaining the spirit of the present principles. The user input devices 152, 154 can be the same type of user input device or different types of user input devices. The user input devices 152, 154 are used to input and output information to and from system 100, in accordance with aspects of the present invention. Image matching can be executed by an image matching device in block 164, which can be operatively connected to the system 100 for image feature matching with formal privacy guarantees, in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 700 and 800, described below with respect to FIGS. 7 and 8, respectively, are systems for implementing respective embodiments of the present invention. Part or all of processing system 100 may be implemented in one or more of the elements of systems 700 and 800 in accordance with aspects of the present invention.

Further, it is to be appreciated that processing system 100 may perform at least part of the methods described herein including, for example, at least part of methods 200, 300, 400, 500, 600, and 700, described below with respect to FIGS. 2, 3, 4, 5, 6, and 7, respectively. Similarly, part or all of systems 700 and 800 may be used to perform at least part of methods 200, 300, 400, 500, 600, and 700, of FIGS. 2, 3, 4, 5, 6, and 7, respectively, in accordance with aspects of the present invention.

As employed herein, the term "hardware processor subsystem", "processor", or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 2:
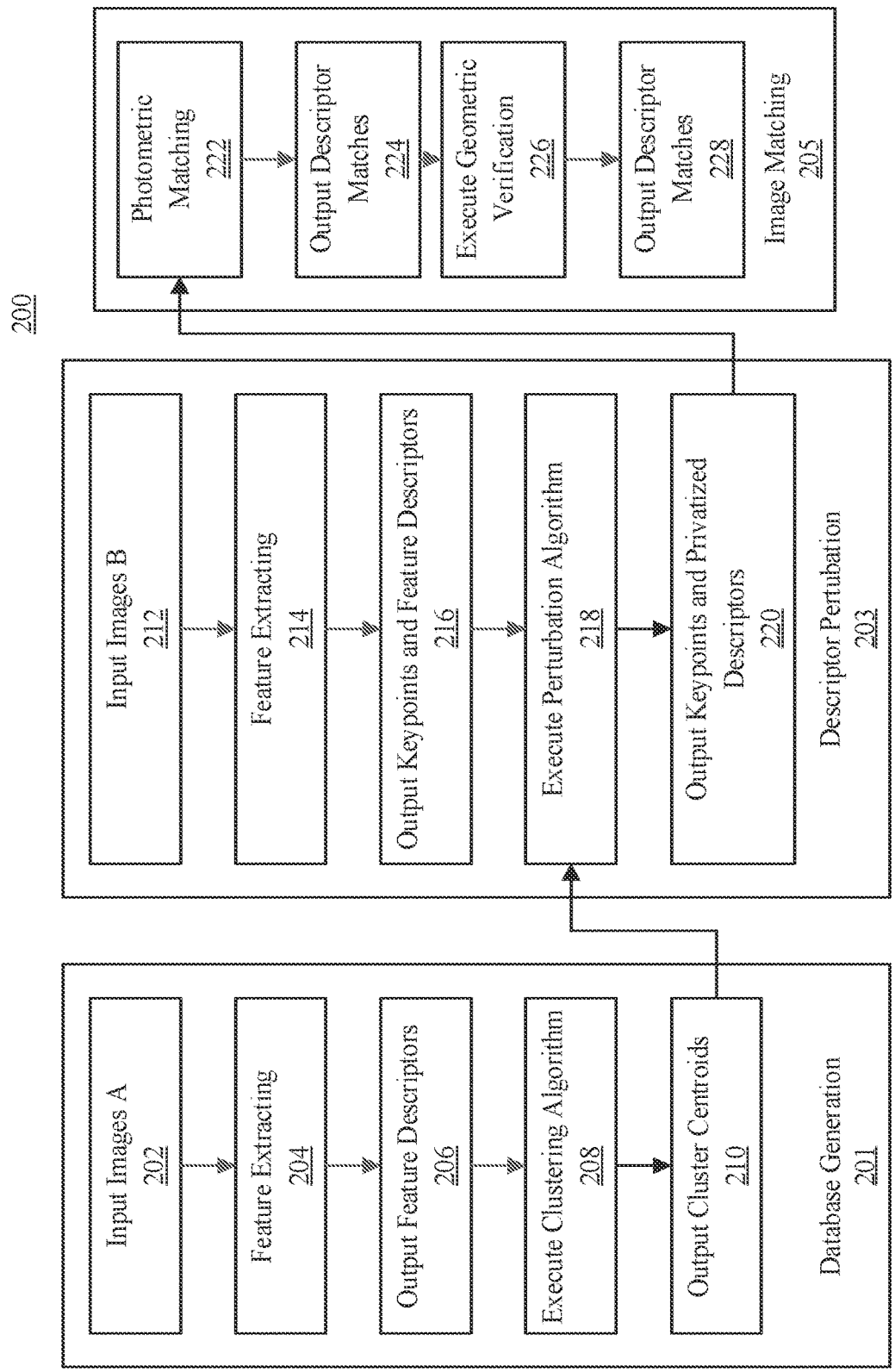
FIG. 2 is a block diagram illustratively depicting a high-level view of a method for image feature matching with formal privacy guarantees, in accordance with embodiments of the present invention.

Referring now to FIG. 2, a high-level view of a method 200 for image feature matching with formal privacy guarantees is illustratively depicted in accordance with embodiments of the present invention. In various embodiments, the method 200 can include performing an image matching process, which can include processing input images (e.g., A and B), executing feature extraction, descriptor perturbation, clustering, photometric matching, and geometric verification, culminating in the matching of images with formal privacy guarantees, in accordance with aspects of the present invention.

In some embodiments, in block 201, database generation can be performed for an image (e.g., Image A), which can include creating a database from input images A by extracting features and executing a clustering algorithm to generate cluster centroids. Feature descriptors can be extracted from the input images and fed into a clustering algorithm, which can assign each descriptor to one of k clusters. The cluster centroids (e.g., mean descriptor from each cluster) can be preserved to be used as a descriptor database for the perturbation algorithm. In block 202, which can be considered a starting point for database generation in this embodiment, Image A can be input for feature extraction. In block 204, features can be extracted from input Image A to produce descriptors. In block 206, resulting feature descriptors from Image A can be output, and in block 208, a clustering algorithm can be applied to the output feature from Image A to organize them into clusters. In block 210, cluster centroids from Image A can be output, and can represent characteristic features of the input images (e.g., Image A), in accordance with aspects of the present invention.

In various embodiments, in block 203, descriptors for an additional image (e.g., Image B) can be privatized/perturbed to protect image privacy. Feature descriptors and their associated keypoints can be extracted from input images and then fed into a perturbation algorithm to obtain pairs of privatized descriptors and keypoints. The perturbation algorithm can first replace each input descriptor d with its nearest neighbor d'∈ K, where K denotes the database generated in block 201. Then it can replace d' with a random set of descriptors Z⊂D of size m. To generate Z, a Bernoulli random variable u can be sampled, where $$p(u=1) = \frac{me^\epsilon}{me^\epsilon + |K| - m},$$

and m−u descriptors Y can be randomly sampled from K−{d'}. If u=1, Z=Y∪{d'} else, Z=Y, noting that this perturbation algorithm satisfies E-LDP, in accordance with aspects of the present invention.

In various embodiments, in block 212, Image B can be input for feature extraction and subsequent descriptor perturbation. In block 214, features can be extracted from input Image B in a similar manner as described above with regard to Image A. Keypoints and associated feature descriptors from image B can be output in block 216, and a perturbation algorithm can be applied to the output keypoints and descriptors from Image B to privatize them in block 218. Keypoints and privatized descriptors from Image B can be output in block 220 for image matching in block 205, which can include photometric matching in block 222. The photometric matching 222 can include matching privatized descriptors from Image B with the cluster centroids from Image A based on any of a plurality of photometric criteria, in accordance with aspects of the present invention.

In various embodiments, in block 205, first photometric matching is done in block 222 by computing pairwise distances between the descriptors from different images to identify pairs that meet a specific matching criterion for descriptor matches in block 224. The photometric matches are then used to perform geometric verification in block 226, which can include using RANSAC to estimate the fundamental or essential matrix relating an image pair, from a set of photometric matches. Then, the photometric matches that are consistent with the estimated matrix are returned as geometrically verified matches for descriptor matches in block 228, in accordance with embodiments of the present invention.

In various embodiments, descriptor matches can be output in block 224, and can include, for example, matches between descriptors of Image A and Image B. Geometric verification can be executed in block 226, and can use, for example, RANSAC to verify the descriptor matches. Following the geometric verification in block 226, which can the fundamental or essential matrix relating an image pair from a set of photometric matches, photometric matches that are consistent with the estimated matrix can be returned as geometrically verified matches in block 228, in accordance with aspects of the present invention.

Figure 3:
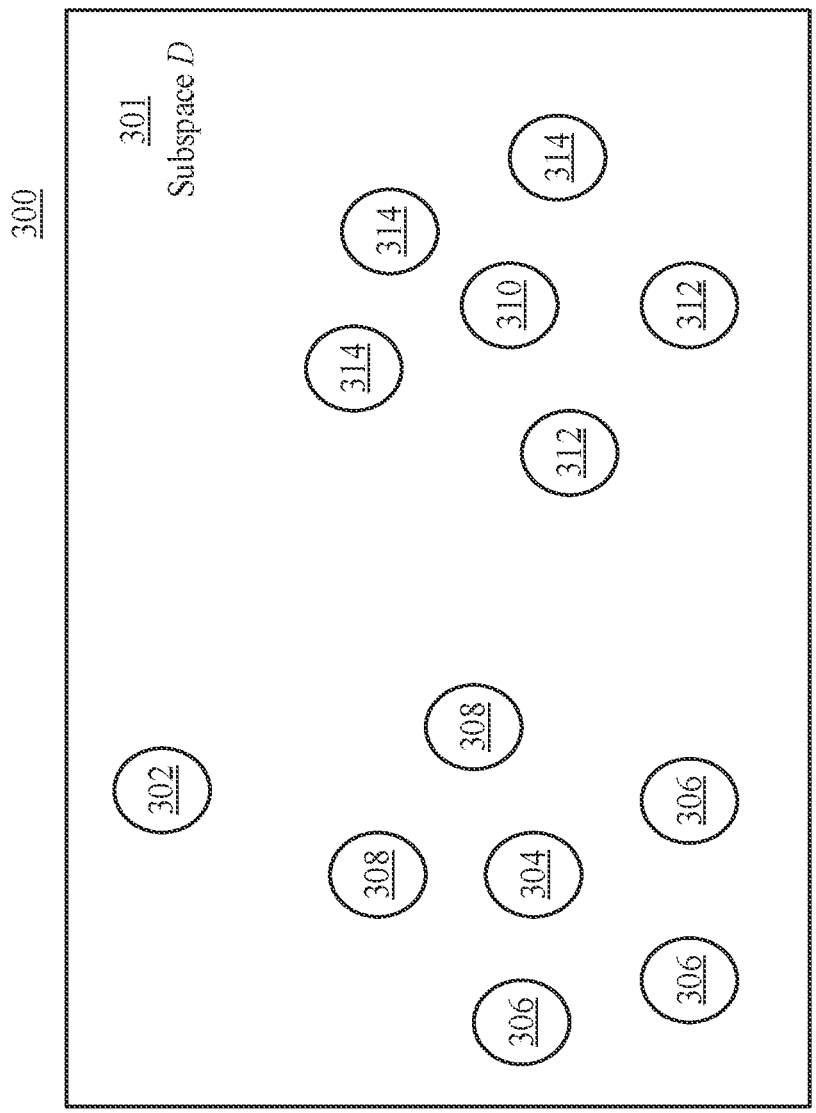
FIG. 3 is a diagram illustratively depicting an exemplary method for a database attack against adversarial lifting, in accordance with embodiments of the present invention.
Figure 3:
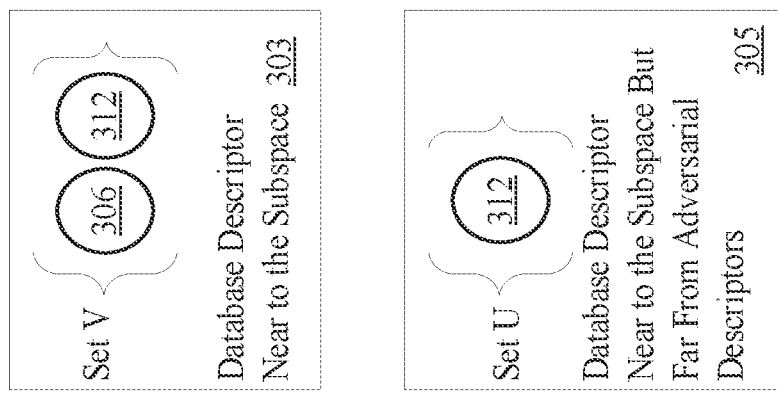

Referring now to FIG. 3, a diagram showing an exemplary method 300 for a database attack against adversarial lifting, is illustratively depicted in accordance with embodiments of the present invention.

It is notable that many computer vision services require users to share raw feature descriptors with an untrusted server. This presents an inherent privacy risk as raw descriptors may be used to recover the source images from which they were extracted. In various embodiments, to address this issue, users can privatize their descriptors locally, prior to sharing them, by "lifting" each descriptor to an adversarial affine subspace embedding. With regard to subspace lifting, for ease of illustration, let d E R" denote a descriptor to be privatized. The present invention can include lifting d to an m dimensional affine subspace $D \subset \mathbb{R}^n$ satisfying $d \in D$, represented by a translation vector $d_0$ and m basis vectors $\{d_1, \ldots, d_m\}$, i.e. $D = d_0 + \text{span}(d_1, \ldots d_m)$.

In various embodiments, the present invention can include a selection of a subspace to ensure d not be easily recoverable, and a selected subspace (e.g., subspace D) can intersect the manifold of real-world descriptors at multiple points. Approximately (or exactly) half of the basis descriptors can be randomly selected from a database of real-world descriptors W, and the other half can be randomly generated via random sampling from a uniform distribution $$\left(\text{e.g., setting } d_0 = d \text{ and } d_i = a_i - d \text{ for } i = \left\{1, \ldots, \frac{m}{2}\right\},\right.$$

$$\left.\text{where } a_i \sim \mathcal{U}\{W\} \text{ and } d_i \sim \mathcal{U}([-1, 1])^n \text{ for } i = \left\{\frac{m}{2}, \ldots, m\right\}\right).$$

Thus, d and $a_i$ s can be contained in D utilizing this this half-and-half approach (e.g., as hybrid lifting), in accordance with aspects of the present invention.

In various embodiments, reparameterization can then be executed, as since the above representation of D can directly expose the descriptors, the present invention can reparameterize D to prevent information leakage. First, to avoid setting the translation vector as the raw descriptor d to be concealed, the present invention can randomly generate a new translation vector $d_0 = p_\perp^D(e_0)$, where $p_\perp^D(e_0)$ denotes the orthogonal projection of $e_0$ onto D, $e_0 \sim \mathcal{U}([-1,1])^n$. Further, to prevent an attacker from using the direction of the basis descriptors to infer the original descriptor d, a new set of basis descriptors $d_i = p_\perp^D(e_i)$ for i={1, . . . , m}, where $e_i \sim \mathcal{U}([-1,1])^n$, can be randomly generated, noting that the above two steps reparametrize D without changing its intrinsic property. Once a descriptor has been lifted to an adversarial affine subspace embedding, the present invention can utilize point-to-subspace and subspace-to-subspace distances for matching raw-to-lifted and lifted-to-lifted descriptors, respectively, in accordance with aspects of the present invention.

In accordance with embodiments of the present invention, the method 300 shows a database attack, which can include a mechanism for inverting adversarial affine subspace embeddings. In this embodiment, the adversarial affine subspace, designated as 301 (Subspace D), is depicted as including both database descriptors and adversarial descriptors. The subspace 301 is a geometric representation of the privacy-preserving transformation applied to the original descriptor, labeled as 310, which the system is designed to protect, in accordance with aspects of the present invention.

In various embodiments, block 302 can indicate a random adversarial descriptor, which is can be part of a set of descriptors used to form the adversarial affine subspace 301. These descriptors can be chosen to obfuscate the original descriptor 310 in the high-dimensional space, effectively concealing it from straightforward recovery methods. The database adversarial descriptor is denoted by 304. It can be selected from a pre-existing database of descriptors and can be used, in combination with random adversarial descriptors 302, to generate the adversarial subspace 301. The combination of these descriptors ensures that subspace 301 intersects the manifold of real-world descriptors at various points, thus enhancing the security against descriptor recovery.

In various embodiments, set V, indicated by 303, can include database descriptors such as 306 and 312 that are proximate to the subspace 301. These descriptors are close to the transformation space and can be potential candidates for matching with the original descriptor to conceal 310 in the process of inversion. Set U, shown at 305, includes descriptors such as 312 that are near to the subspace 301 but are specifically selected to be distant from adversarial descriptors, thereby refining the inversion process by excluding descriptors that are not representative of the original descriptor 310. The original descriptor to conceal 310 is the target of the privacy preservation mechanism. It is the descriptor from which the adversarial affine subspace 301 is derived and which the database attack strategy aims to protect from disclosure. Descriptors marked by 314 represent the intersection of the adversarial affine subspace with the manifold of real-world descriptors. They signify the points where the original descriptor 310 and the database adversarial descriptors 304 can be located.

In the context of the database attack, the method 300 can include computing distances from subspace 301 to each descriptor in the database, identifying adversarial descriptors, and estimating the concealed original descriptor 310. The illustration serves to visually summarize the steps and components involved in the privacy-preserving mechanism described herein. It is noted that intuition for why this attack can be successful is that any descriptors from database W that are near the subspace D will very likely cluster around either the original descriptor d or one of the adversarial descriptors, as these are likely to be the only points where the subspace intersects the manifold of real-world descriptors. The invention thus can provide a robust method for preserving the privacy of descriptors in untrusted computational environments, leveraging adversarial affine subspace embeddings and inversion techniques to protect against unauthorized recovery of source image information, in accordance with aspects of the present invention.

In various embodiments, for a database attack, it can be assumed that the attacker has access to the database of real-world descriptors from which the adversarial descriptors were selected. The attack can be based on the empirical observation that for most descriptors (e.g., SIFT, HardNet, etc.), an adversarial affine subspace likely only intersects the descriptor manifold at the points corresponding to the original descriptor d and the adversarial descriptors $$\{a_1, \ldots, a_{\frac{m}{2}}\}$$

that were sampled from the database of real-world descriptors W. Assuming the above observation holds, the present invention can identify the m/2 subspace-manifold intersections corresponding to the adversarial descriptors $$\{a_1, \ldots, a_{\frac{m}{2}}\},$$

and thus reduce the recovery of descriptor d to finding the one remaining subspacemanifold intersection. This is the format of the exemplary attack illustrated in FIG. 3, with n=3 and m=2, i.e. subspace being a plane in $\mathbb{R}^3$.

In various embodiments, a first step can include computing the distances dist (D, $w_i$)=$\|w_i - p_\perp^D(w_i)\|_2$ between subspace D and each descriptor in the database of real-world descriptors $w_i \in W$, and then sort the descriptors in ascending order according to their respective distances. Next, adversarial descriptors can be identified, noting that the adversarial descriptors are selected from W, hence dist(D, $w_i$)=0 holds exactly for $$i = \left\{1, \ldots, \frac{m}{2}\right\},$$

which means the first m/2 descriptors from the sorted list immediately give our estimates $$\{\hat{a}_1, \ldots, \hat{a}_{\frac{m}{2}}\}$$

for the adversarial descriptors 308.

In various embodiments, a concealed descriptor can be estimated, noting that unlike the adversarial descriptors, the database may not contain the original descriptor d, but the present invention can estimate it by its close neighbors in the database. To this end, the next |V| descriptors in the sorted list, V={$v_1, \ldots, v_{|V|}$}, |V|<<|W|, can be selected, including the descriptors nearest to D for which dist(D, $v_i$)>0. More specifically, these descriptors can be near to either the adversarial descriptors or the raw descriptor, and the present invention can further select a subset U∈V, where |U|<<|V|, which is close to the raw descriptor d but far from the adversarial ones. U and V are both illustrated in FIG. 2(a). To select U, a score $$s_i = \min_{j=1,\ldots,\frac{m}{2}} \|\hat{a}_j - v_i\|_2$$

can be computed for each descriptor in V. The descriptors with the highest scores, $u_1, \ldots, u_{|U|}$, can be used to estimate d via weighted average and orthogonal projection:

$$\hat{d} = p_\perp^D\left(\frac{1}{\alpha}\sum_{i=1}^{U} \frac{u_i}{dist(D, u_i)}\right) \quad (1)$$

where $\alpha = \sum_{i=1}^{U} dist(D, u_i)^{-1}$, in accordance with aspects of the present invention.

Figure 4:
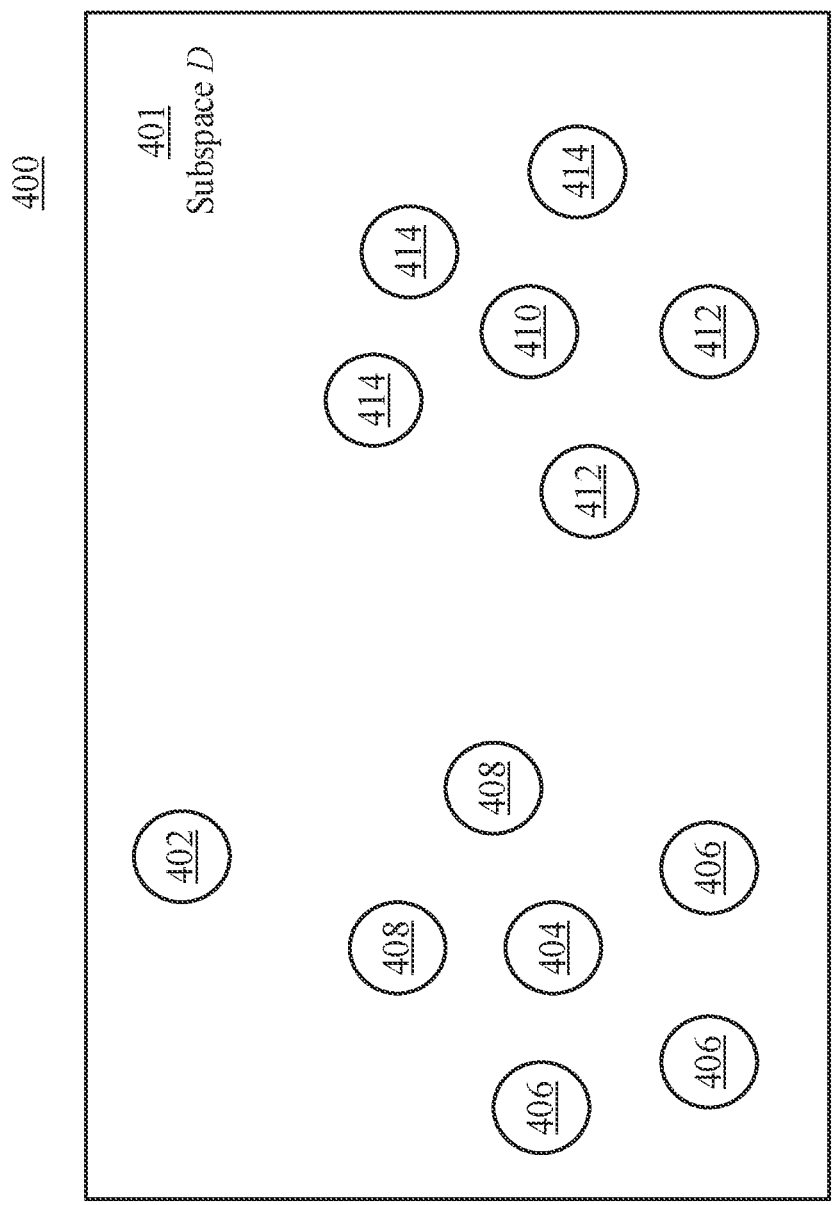
FIG. 4 is a diagram illustratively depicting an exemplary method for a clustering attack against adversarial lifting, in accordance with embodiments of the present invention.

Referring now to FIG. 4, a diagram showing an exemplary method 400 for a clustering attack against adversarial lifting is illustratively depicted in accordance with embodiments of the present invention.

In various embodiments, for this exemplary attack, it can be assumed that the database of real-world descriptors W from which the adversarial descriptors $$a_{i=1,\ldots,\frac{m}{2}}$$

are sampled is not known. To address this issue, a first step of the attack is to use a public dataset to construct a database of real-world descriptors Z to serve as a proxy for W. Next, the distances dist(D, $z_i$)=$\|z_i - p_\perp^D(z_i)\|^2$ between subspace D and each descriptor $z_i \in Z$ can be computer. Then, the V<<|Z| descriptors with the smallest distances, denoted as $v_{i=1,\ldots,v}$, are selected. Note that $$a_{i=1,\ldots,\frac{m}{2}}$$

can no longer be identified exactly, as, in general, dist (D, $z_i$)≠0 for any i. Instead, k-means can be performed to cluster V into $$k = \frac{m}{2} + 1$$

clusters and assign each $v_i$ a cluster label $$l_i \in \left\{1, \ldots, \frac{m}{2} + 1\right\}.$$

The descriptors from each cluster can then be separated and used to produce k estimates $\hat{d}^{i=1,\ldots,k}$ of the original descriptor d as follows:

$$\hat{d}^i = p_\perp^D\left(\frac{1}{\alpha_i}\sum_{j=1}^{V} \mathbb{1}(l_j, i)\frac{v_i}{dist(D, v_i)}\right) \quad (2)$$

where $\alpha_i = \sum_{j=1}^{V} \mathbb{1}(l_j, i) dist(D, j_i)^{-1}$ and $\mathbb{1}(x, y)=1$ when x=y and 0 when x≠y. A reason this attack produces $$k = \frac{m}{2} + 1$$

predictions for the original descriptor d is that it's not possible to disambiguate whether an intersection between subspace D, and the manifold of real-world descriptors corresponds to the original descriptor d or one of the adversarial descriptors $$\{a_1, \ldots, a_{\frac{m}{2}}\},$$

in accordance with aspects of the present invention.

In various embodiments, FIG. 4 shows an exemplary representation of a clustering attack, as identified generally at 400, on adversarial affine subspace embeddings used for descriptor privacy in image processing. This figure illustrates the methodology for clustering attack when the original database of real-world descriptors is unknown. In the depicted embodiment, subspace D, marked as 401, is an m-dimensional affine space derived from original image descriptors for the purpose of concealing the original descriptor, denoted by 410. This subspace is constructed by 'lifting' the original descriptor into a higher dimensional space to protect its privacy. The random adversarial descriptor, labeled 402, constitutes part of the adversarial descriptors set that is used to form subspace D. These descriptors are randomly generated to obfuscate and complicate direct recovery of the original descriptor, labeled 410.

In various embodiments, the database adversarial descriptor, indicated by 404, is chosen from a substitute database of descriptors to simulate the unknown real-world descriptor database. These are used along with the random adversarial descriptors to create a space that contains multiple intersections with the real-world descriptor manifold, thereby making direct recovery of the original descriptor challenging. Blocks 412 and 414 show descriptors which represent potential intersections of the adversarial affine subspace with the manifold of real-world descriptors. These points are critical in the clustering attack as they provide estimates for the original descriptor. In the context of this clustering attack, the process involves computing distances from the subspace D to each proxy descriptor, selecting a subset with the smallest distances, clustering them, and using the resulting clusters to generate multiple estimates of the original descriptor. This allows for the reconstruction of the original descriptor while maintaining the privacy constraints set forth by the use of adversarial affine subspace embeddings. The presented methodology provides an effective approach to address the challenge of descriptor privacy in image processing applications, ensuring that sensitive image information remains protected even when the original database of real-world descriptors is not accessible, in accordance with aspects of the present invention.

Experiments have been conducted to evaluate the efficacy of adversarial affine subspace embeddings of local descriptors on three utility tasks: image matching, localization, and structure from motion. For all three of these tasks, a user (or client) is expected to publicly share a set of keypoint-subspace pairs as a proxy for a set of raw keypoint-descriptor pairs extracted from the same image. In the two attacks discussed above with reference to FIGS. 3 and 4, each subspace (e.g., each descriptor/keypoint), is attacked independently. This constraint can be relaxed and all subspaces corresponding to a given source image can be considered simultaneously. This enables to train a U-Net style convolutional neural network (CNN) to reconstruct the source image from a feature map consisting of (a) one or more candidate descriptors at each keypoint location or (b) m+1 descriptors corresponding to the translation and basis vectors of an adversarial affine subspace, noting that for (a), the candidate descriptors at each keypoint location can be generated by applying attacks 1 or 2 (FIGS. 3 and 4, respectively), in accordance with aspects of the present invention.

Figure 5:
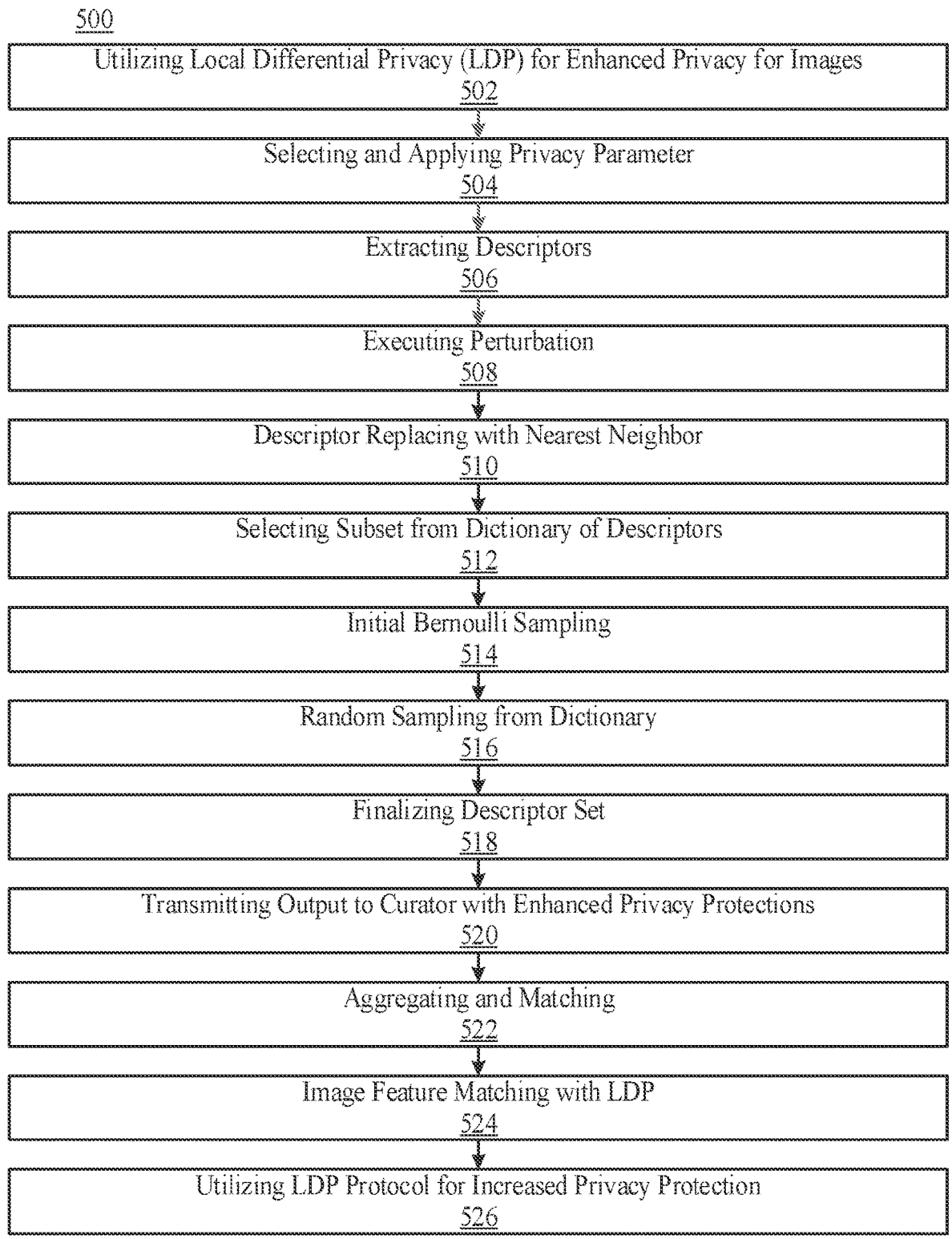
FIG. 5 is a block/flow diagram illustratively depicting a method for image feature matching with formal privacy guarantees, in accordance with embodiments of the present invention.

Referring now to FIG. 5, a block/flow diagram showing a method 500 for image feature matching with formal privacy guarantees is illustratively depicted in accordance with embodiments of the present invention.

In various embodiments, in block 502, utilization of Local Differential Privacy (LDP) mechanisms for enhancing privacy in image processing tasks can be performed. LDP ensures that individual data points within an image remain private, even when processed by an untrusted server. The mechanism employed here can guarantee the indistinguishability of outputs for any two given inputs, achieved through the introduction of carefully calibrated noise to the data. This noise ensures that the presence or absence of any single data point does not significantly alter the probability distribution of the output, thus safeguarding user privacy while enabling effective image feature matching.

In the centralized differential privacy setting a trusted data curator aggregates data from one or more users, processes the data in a differentially private manner, and then publishes the sanitized results. For settings where a trusted data curator is not available, local differential privacy can be employed. In the local differential privacy (LDP) setting, users sanitize their data locally, prior to sending it to a curator, so the curator need not be trusted. In what follows, we describe definitions and properties of LDP that are utilized for this task as follows. Definition 1 (Local Differential Privacy) A randomized mechanism $\mathcal{M}$ satisfies $\epsilon$-local differential privacy ($\epsilon$-LDP), where $\epsilon \geq 0$, if and only if for any inputs $x_1$ and $x_2$, $$\forall y \in \text{Range}(\mathcal{M}): \frac{Pr[\mathcal{M}(x_1) = y]}{Pr[\mathcal{M}(x_2) = y]} \leq e^{\epsilon} \quad (3)$$

where Range ($\mathcal{M}$) denotes the set of all possible outputs of M. Note that M maps the input to a probability distribution rather than a single point. The $\epsilon$ controls the similarity in the output, and is termed as the privacy parameter or privacy budget-a smaller E indicates higher privacy protection, and vice versa. To illustrate this, we note that according to the definition of LDP, Eq. 3 holds if we swap $x_1$ and $x_2$, i.e., $Pr[\mathcal{M}(x_2)=y] \leq e^{\epsilon} Pr[\mathcal{M}(x_1)=y]$. When $\epsilon=0$, it follows that $Pr[\mathcal{M}(x_2)=y]=Pr[\mathcal{M}(x_1)=y]$, $\forall y \in$ Range ($\mathcal{M}$). This means $x_1$ and $x_2$ have an identical distribution after M perturbation, and are indistinguishable from each other, hence yielding strongest privacy protection. Conversely, a larger $\epsilon$ loosens the constraint in Eq. 3, as well as its incurred privacy preserving.

Selection of $\epsilon$ can be performed in block 504. While E may be set as any positive number, it is a common practice to confine its range within [0.01,10], which was shown to ensure good privacy protection in practice [20,51]. Definition 2 ($\omega$-Subset Mechanism) Denoting the data domain by $\mathcal{K}$, for any input $v \in \mathcal{K}$ we randomly report a $\omega$-sized subset $\mathcal{Z}$ of $\mathcal{Z}$, i.e. $\mathcal{K} \subset \mathcal{K}$ and $|\mathcal{Z}|=\omega$, with probability:

$$Pr(\mathcal{Z} \mid v) = \begin{cases} \frac{\omega e^{\epsilon}}{\omega e^{\epsilon} + |\mathcal{K}| - \omega} / \binom{|\mathcal{K}|}{\omega}, & \text{if } v \in \mathcal{Z} \\ \frac{\omega}{\omega e^{\epsilon} + |\mathcal{K}| - \omega} / \binom{|\mathcal{K}|}{\omega}, & \text{if } v \notin \mathcal{Z} \end{cases} \quad (4)$$

The ω-Subset Mechanism (ω-SM) satisfies ϵ-LDP [46, 51]. It is important to note that the data domain $\mathcal{K}$ is required to be a finite space, i.e., consisting of countably many elements. In what follows, we formulate our image feature perturbation as ω-SM for privacy guarantee.

In block 504, the parameter ε, can play a pivotal role in balancing privacy protection and utility in feature matching, can be selected. The ε parameter quantifies the level of privacy assurance provided by the LDP mechanism, with lower values indicating stronger privacy protections. However, selecting an appropriate ε value is crucial to ensure that the utility of the processed data is not unduly compromised. Factors influencing this selection include the sensitivity of the data, the desired level of privacy protection, and the impact of privacy settings on the accuracy and effectiveness of image matching outcomes. Various strategies for determining the optimal ε value can be utilized, maximizing data utility while maintaining robust privacy protections, in accordance with aspects of the present invention.

Block 506 elaborates on the initial step of the image matching process, where users extract feature descriptors from image keypoints. Feature descriptors are raw data vectors that represent distinctive image features and are critical for subsequent image matching processes. Various techniques for extracting these descriptors, such as Scale-Invariant Feature Transform (SIFT) or Speeded Up Robust Features (SURF), may be employed depending on the specific application requirements. The extracted descriptors serve as the foundation for subsequent privacy-preserving operations in the image matching pipeline.

In various embodiments, following descriptor extraction, block 508 details the process of locally perturbing the extracted descriptors to protect user privacy. Local perturbation involves applying privacy-preserving algorithms that add noise to the descriptors, ensuring that the raw descriptors cannot be accurately reconstructed by an untrusted server. This step is important for preventing unauthorized access to sensitive image data while preserving the utility of the descriptors for matching purposes. The perturbation process is carefully calibrated to strike a balance between privacy protection and data utility, ensuring that the perturbed descriptors retain their discriminative features for effective matching. In block 510, post-perturbation, each descriptor is replaced with its nearest neighbor within a predefined dictionary of descriptors, created from a vast public database of images. This dictionary serves as a reference for preserving the utility of the descriptors while enhancing privacy. The replacement process ensures that the perturbed descriptors remain semantically meaningful and representative of the original image features. Techniques such as k-means clustering may be employed to structure the dictionary and facilitate efficient nearest neighbor searches, further enhancing the scalability and effectiveness of the image matching process.

In block 512, the ω-Subset Mechanism is utilized to select a ω-sized subset from the dictionary of descriptors. The subset selection process is guided by privacy considerations, ensuring that the selected subset preserves the privacy of the original descriptors while maintaining their utility for matching purposes. The ω parameter determines the size of the subset, with careful consideration given to balancing privacy protection and data utility. This mechanism enhances the scalability and efficiency of the image matching process by reducing the computational complexity associated with processing large datasets while preserving the privacy of individual users. In block 514, a Bernoulli sampling process is employed to decide whether the original nearest neighbor descriptor should be included in the selected subset. This decision-making process is governed by a probability distribution determined by the privacy parameter E. The Bernoulli sampling technique ensures that the inclusion of the original descriptor in the subset is probabilistic, adding an additional layer of privacy protection while minimizing the impact on data utility. The probability distribution is carefully calibrated to strike a balance between privacy and utility, ensuring that the subset accurately represents the original image features while preserving user privacy.

In block 516, depending on the outcome of the Bernoulli sampling process, additional descriptors are randomly sampled from the dictionary to form the final perturbed descriptor set. The random sampling process further enhances the privacy of the descriptor set by introducing variability and unpredictability in the selection of descriptors. This randomness ensures that the perturbed descriptor set remains representative of the original image features while preventing unauthorized reconstruction of the data. The random sampling technique is carefully designed to preserve the statistical properties of the original dataset while providing robust privacy protections against adversarial attacks. In block 518, descriptor set finalization can be performed by finalizing the perturbed descriptor set, incorporating the selected subset and the randomly sampled descriptors. The final descriptor set is carefully curated to balance privacy protection and data utility, ensuring that it accurately represents the original image features while preserving user privacy. The inclusion of the selected subset and the randomly sampled descriptors is governed by privacy considerations, with the privacy parameter ε playing a crucial role in determining the level of privacy assurance provided by the final descriptor set. This step ensures that the perturbed descriptor set is well-suited for subsequent image matching processes while safeguarding user privacy.

In various embodiments, following finalization, the perturbed descriptor sets can be securely transmitted to the data curator for further processing in block 520. The transmission process is designed to ensure the confidentiality and integrity of the data, incorporating encryption and other security measures to protect against unauthorized access. This step enables the aggregation of perturbed descriptors from multiple users, facilitating collaborative image matching tasks while preserving individual privacy. The secure transmission of perturbed descriptor sets to the data curator ensures the integrity and reliability of the image matching process, enabling accurate and effective matching outcomes across diverse datasets. In block 522, upon receiving the perturbed descriptor sets, the data curator aggregates the descriptors and performs photometric matching to find corresponding points between different images. Geometric verification algorithms such as Random Sample Consensus (RANSAC) are then applied to confirm the matches despite the perturbations introduced during the privacy-preserving process. This step ensures accurate and reliable matching outcomes while preserving user privacy, demonstrating the effectiveness of the privacy-preserving image matching system in real-world applications.

Block 524 expands on the application of Local Differential Privacy (LDP) to the specific context of image feature matching. The privacy-preserving mechanisms described in earlier blocks are integrated into a comprehensive image matching framework, ensuring robust privacy protections while enabling accurate and effective matching outcomes. The use of LDP mechanisms enhances the privacy assurances of the image matching process, ensuring that individual data points within the images remain confidential even when processed by untrusted servers. This section highlights the practical applications of LDP in enhancing privacy protections in image processing tasks, underscoring the system's effectiveness in safeguarding user privacy while enabling collaborative image matching tasks.

In various embodiments, as in other domains where LDP has been applied, there are two main steps involved in applying LDP to image matching: the perturbation step and the aggregation step. In the perturbation step, users can extract feature descriptors from image keypoints, locally perturb the descriptors, and then send the perturbed descriptors along with their associated keypoints to the data curator. In the aggregation step, the curator receives the pairs of perturbed descriptors and keypoints from one or more users and then performs photometric matching followed by geometric verification, in accordance with aspects of the present invention.

The perturbation step in block 508 introduces privacy protection but also presents an inherent challenge for the correspondence task-perturbing the descriptors too much inhibits accurate computation of distances between descriptors, leading to a reduced number and proportion of correct (inlier) photometric matches. This is an issue for three reasons. Firstly, the number of iterations required for RANSAC-based geometric verification increases exponentially relative to the proportion of inliers. Secondly, fewer inliers lead to less accurate estimates of the geometric model (e.g. fundamental matrix) due to the keypoint locations being noisy. Finally, the number of geometrically verified matches plays an important role in many downstream tasks for which correspondence is a key building block, such as structure-from-motion and image retrieval. The present invention can utilize an LDP mechanism that offers guaranteed privacy preserving while yielding good utility in downstream tasks, in accordance with aspects of the present invention.

Given these challenges, the present invention can utilize the following novel LDP protocol that builds on the ω Subset Mechanism (ω-SM). A conventional (Naive Approach), using LDP on the full descriptor space, includes applying @-SM directly on the descriptor space (e.g., defining $\mathcal{K}$ as the set of all possible descriptors and randomly reporting a set of descriptors-which may include the raw descriptors) for obfuscation. This is applicable to image descriptors as they have a finite domain size $|\mathcal{K}|$ as required by ω-SM: $|\mathcal{K}|=2^{8\times128}$ for 128-dim uint8-based descriptors, such as SIFT, and $|\mathcal{K}|=2^{32\times128}$ for 128-dim float32-based descriptors, such as HardNet. However, naively setting the output space to the full descriptor domain does not lead to a desirable privacy-utility trade-off. This is at least in part caused by the domain size being too large.

The present invention can perform random sampling of LDP from a dictionary of descriptors in block 516. Defining the data domain $\mathcal{K}$ as a finite dictionary of descriptors established from real-world image collections, this dictionary serves as the database shared with all users. More specifically, the database can be created by extracting descriptors from a large public database of images and then performing k-means, in accordance with aspects of the present invention. Locally, each user can enforce differential privacy by the following steps.

Step 1: Replace each descriptor d that is to be sent to the curator with its nearest neighbor d'∈ $\mathcal{K}$.

Step 2: Then, d' is replaced with a set of descriptors $\mathcal{Z}$ ⊂ $\mathcal{K}$ of size m. We perform random sampling [46] to generate the set $\mathcal{Z}$ that satisfies the probability distribution in Eq. (4): first sample a Bernouilli scale variable u with $$Pr(u=1) = \frac{me^{\epsilon}}{me^{\epsilon} + |\mathcal{K}| - m} \quad (5)$$

then randomly sample m−u descriptors $\mathcal{Y}$ from $\mathcal{K}$ −{d'}. Step 3: if u=1, $\mathcal{Z}$ =$\mathcal{Y}$∪{d'} else $\mathcal{Z}$ =$\mathcal{Y}$.

This approach satisfies ϵ-LDP. In terms of the aggregation step, this means that the curator will receive multiple descriptors per keypoint and may thus have multiple photometric matches per keypoint. The curator can then discover which, if any, of the matches for a given keypoint are correct by performing RANSAC-based geometric verification. Despite the perturbation on the descriptor, good empirical performance is still observed in downstream tasks, as shown in Sec. 6.

Why domain size matters? Referring to Eq. (5), it is clear that, with a fixed value of ϵ, an extremely large value of $|\mathcal{K}|$ renders Pr(u=1) extremely small-which severely limits the sending of raw descriptors to the server. This implies a very low proportion of inlier correspondences, which hinders utility. On the other hand, one observes that increasing ϵ in tandem with $|\mathcal{K}|$ may prevent Pr(u=1) from dropping, however, a larger ϵ quickly reduces the strength of privacy protection; recall that typically is confined within [0.01,10] for practical usage [20,51]. As such, too large a domain size may cause poor privacy-utility trade-off. Similarly, increasing m, the number of descriptors sent to the server, prevents Pr(u=1) from dropping at the cost of reducing the proportion of inliers, which inhibits utility. These factors motivate our design choice to adopt a dictionary of descriptors-based approach.

Relation to affine subspace embeddings. Comparing our proposed method to the adversarial affine subspace embeddings [11], we can observe that they have some similarities, namely that users obfuscate descriptors by hiding them among a set of confounder descriptors that are randomly sampled from a database of real-world descriptors. That said, there are two critical differences between the methods. Firstly, in our proposed method, the set of descriptors $\mathcal{Z}$ sent by each user to the curator must be a subset of finite vocabulary $\mathcal{K}$; recall that the original descriptor d, if included, is also replaced by its nearest neighbor in $\mathcal{K}$. Hence, even if $\mathcal{K}$ is exactly known by a malicious curator, he cannot use $\mathcal{K}$ to perform a database attack of the sort described in Sec. 4. Similarly, a malicious curator is unable to perform a clustering attack of the sort described in Sec. 4. Secondly, thanks to careful design of the obfuscation protocol, our method enables rigorous accounting of the privacy leakage in terms of local differential privacy.

In block 526, an LDP protocol is utilized to enhance the @-Subset Mechanism, further improving the privacy-preserving capabilities of the image matching system. The protocol incorporates advanced privacy-preserving techniques to ensure the indistinguishability of outputs for any two given inputs, enhancing the privacy assurances of the system while maintaining data utility. This section outlines the key features of the proposed LDP protocol, including its compatibility with existing image matching frameworks and its scalability to large-scale image datasets. The integration of the proposed LDP protocol into the image matching system enhances the privacy protections of the system, ensuring that individual users' data remains confidential while enabling collaborative image matching tasks across diverse datasets, in accordance with aspects of the present invention.

Figure 6:
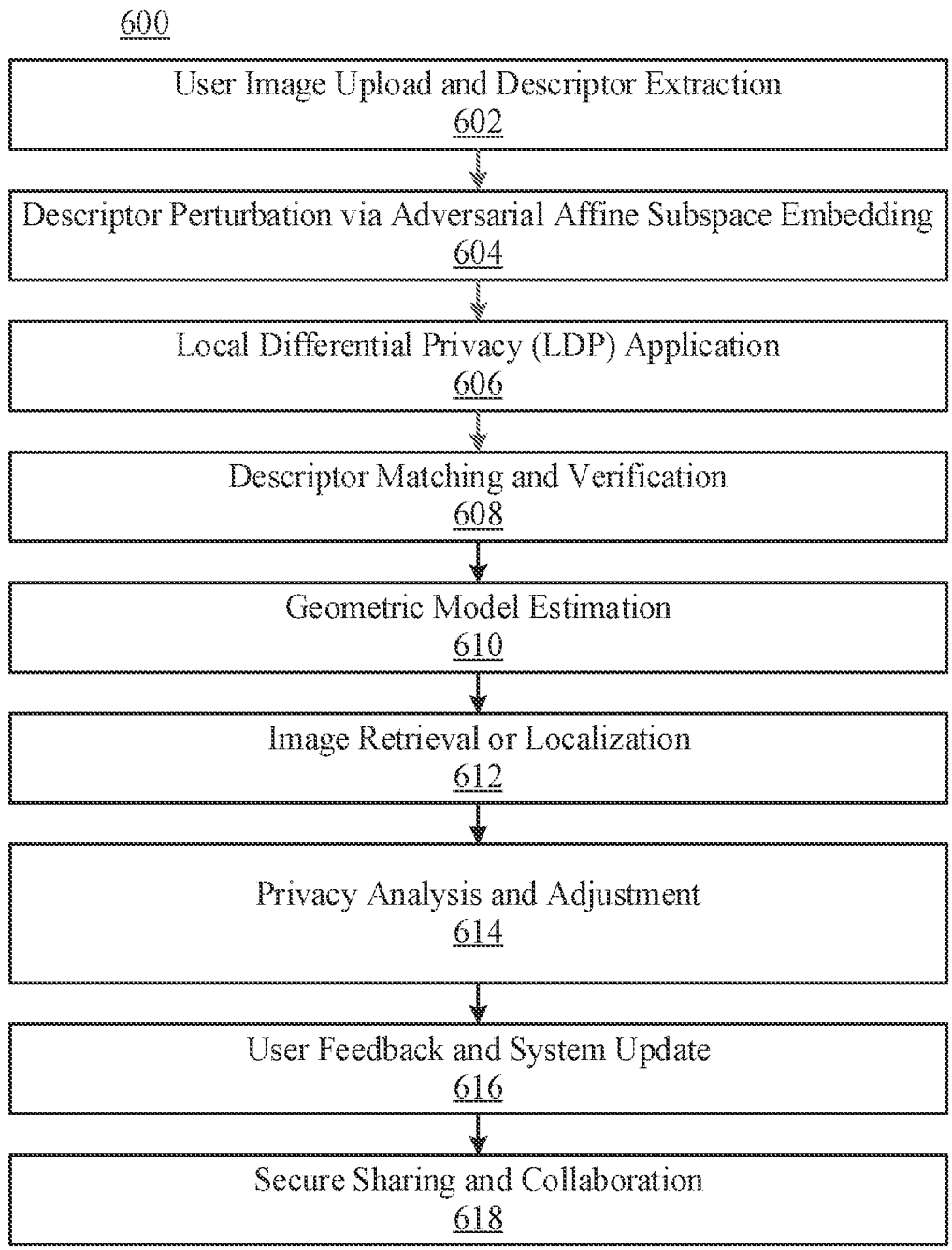
FIG. 6 is a block/flow diagram illustratively depicting a method for privacy-preserving image feature matching, including secure sharing and collaboration on image datasets and leveraging Local Differential Privacy (LDP) for formal privacy guarantees, in accordance with embodiments of the present invention.

Referring now to FIG. 6, a block/flow diagram showing a system and method 600 for privacy-preserving image feature matching, including secure sharing and collaboration on image datasets and leveraging Local Differential Privacy (LDP) for formal privacy guarantees is illustratively depicted in accordance with embodiments of the present invention.

In some embodiments, in block 602, a user can upload an image to a secure platform and the system can extract raw image descriptors (e.g., SIFT, SURF, etc.) from the uploaded images. This step serves as the entry point for applying privacy-preserving techniques to sensitive image data. In block 604, each extracted descriptor can be perturbed by lifting it into an adversarial affine subspace, effectively embedding the descriptor in a higher-dimensional space. This process includes generating a mix of real-world and synthetic descriptors to form a hybrid subspace, complicating direct recovery of the original descriptor. In block 606, the perturbed descriptors undergo further privatization through LDP protocols, specifically employing the @-Subset Mechanism. This step ensures that each descriptor is indistinguishable from its neighbors to a defined degree, bolstering privacy without significantly compromising the utility of the data for matching purposes.

In various embodiments, in block 608, perturbed and privatized descriptors can be matched against a database of similarly protected descriptors or against another set of uploaded images processed through the same pipeline. Matching employs advanced techniques such as point-to-subspace distances and geometric verification (e.g., RANSAC) to ensure accurate and reliable results. In block 610, for applications in structure-from-motion or localization, geometric models (e.g., fundamental matrices) can be estimated from the matched descriptor pairs. Despite the perturbations, the system leverages robust statistical methods to accurately infer geometric relationships. In block 612, based on the matching and geometric modeling, the system retrieves relevant images from a database or localizes the uploaded image within a larger scene. This step demonstrates the practical utility of the privacy-preserving matching system in real-world applications such as digital forensics, augmented reality, and historical archive searching, in accordance with aspects of the present invention.

In various embodiments, in block 614, the system continuously analyzes the privacy-utility trade-off, adjusting parameters of the LDP protocols and subspace embeddings as needed. This adaptability ensures that privacy guarantees are maintained without unduly sacrificing the accuracy and utility of the image matching process. In block 616, user feedback on the matching results and privacy concerns is collected and used to iteratively refine the system. Updates may include enhancements to the descriptor perturbation methods, LDP protocols, or matching algorithms, ensuring the system remains at the forefront of privacy-preserving computer vision technology. In block 718, the system can facilitate secure sharing and collaboration on image datasets. Users can confidently share their images and derived data, knowing that the underlying privacy-preserving mechanisms protect against unauthorized recovery of sensitive information, in accordance with aspects of the present invention.

Figure 7:
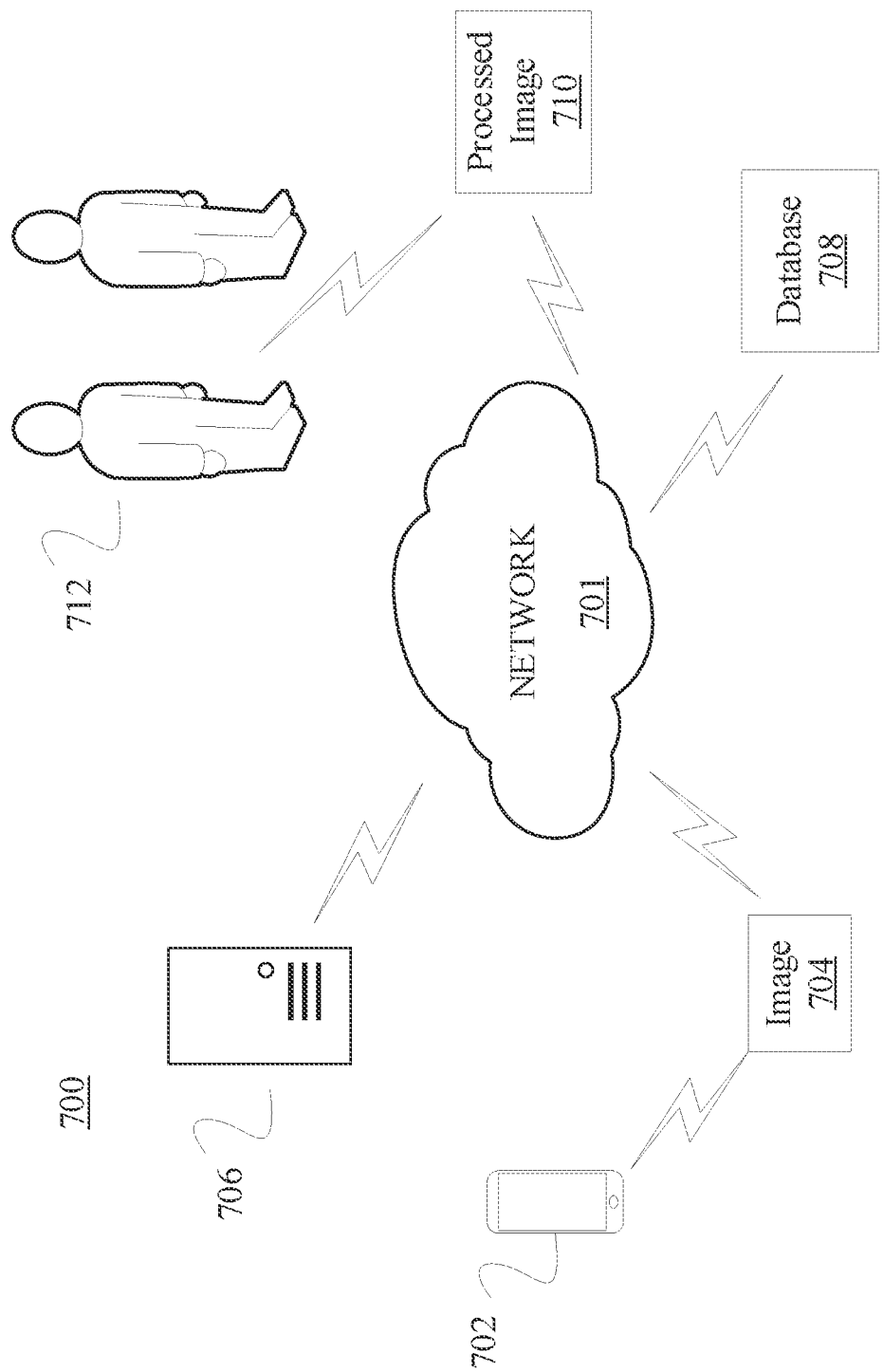
FIG. 7 is a diagram illustratively depicting a system and method for privacy-preserving image feature matching, including secure sharing and collaboration on image datasets and leveraging Local Differential Privacy (LDP) for formal privacy guarantees, in accordance with embodiments of the present invention.

Referring now to FIG. 7, a diagram showing a system and method 700 for privacy-preserving image feature matching, including secure sharing and collaboration on image datasets and leveraging Local Differential Privacy (LDP) for formal privacy guarantees is illustratively depicted in accordance with embodiments of the present invention.

In some embodiments, block 702 represents a user uploading an image 704 to a database 708, server 706 (or other computing device), or cloud using a network 701. The image can be processed to extract raw image descriptors (e.g., SIFT, SURF, etc.). A server 706 (or other computing device) can perform descriptor perturbation via adversarial affine subspace, LDP application, matching and verifying descriptors, geometric model estimation, image retrieval or localization, privacy analysis and adjustment, and receiving user feedback and updating the system, in accordance with aspects of the present invention. The image 704 can be converted into a processed image 710, which can be shared with one or more users 712 across a computing network 701, in accordance with aspects of the present invention.

Figure 8:
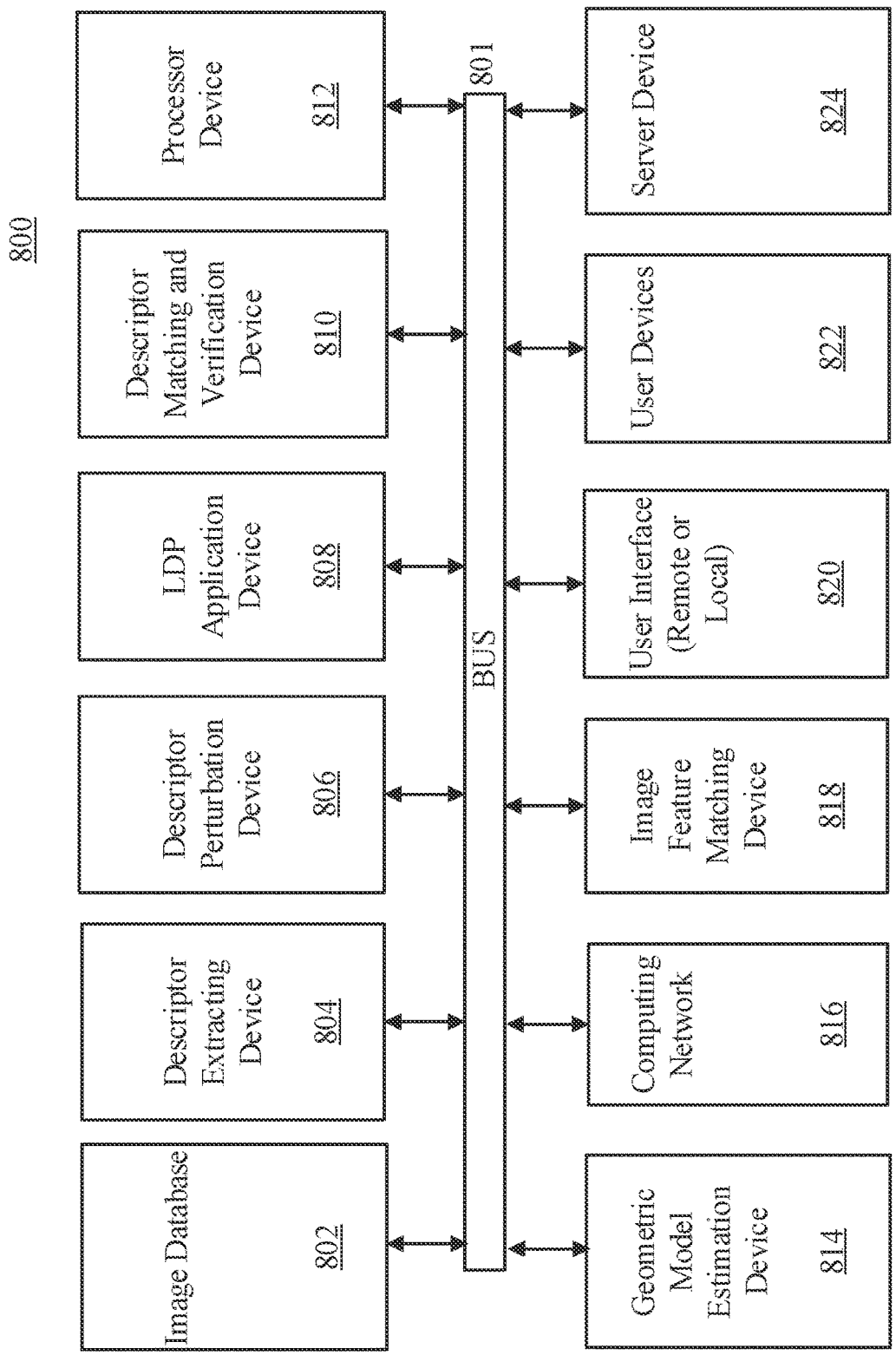
FIG. 8 is a diagram illustratively depicting a system for image feature matching with formal privacy guarantees, in accordance with embodiments of the present invention.

Referring now to FIG. 8, a diagram showing a system 800 for image feature matching with formal privacy guarantees is illustratively depicted in accordance with embodiments of the present invention.

In various embodiments, in block 802, an image database can be utilized to upload an image by one or more user devices 822 to a server device 824 for processing using a processor device 812. The server device 824 can include a descriptor extracting device 804, a descriptor perturbation device 806, and LDP application device 808, a descriptor matching and verification device 810, a processor device 812, a geometric model estimation device 814, an image feature matching device 818, and a processor device 812, which can be operatively connected to one or more user devices 822 via a computing network 816, and can include a user interface 820 (remote or local) for interacting with the system, in accordance with aspects of the present invention.

The components can be interconnected through a Bus 801, which can act as a common communication pathway for data and control signals. This infrastructure enables the system to perform privacy-preserving image feature matching, including secure sharing and collaboration on image datasets and leveraging Local Differential Privacy (LDP) for formal privacy guarantees, in accordance with aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for privacy-preserving image feature matching in computer vision applications, comprising:
    perturbing a raw image descriptor using a subset selection mechanism to generate a perturbed descriptor set that includes the raw image descriptor and additional descriptors;
    replacing each descriptor in the perturbed descriptor set with its nearest neighbor in a predefined descriptor database to reduce an output domain size of the subset selection mechanism;
    employing local differential privacy (LDP) protocols to further perturb the descriptor set, ensuring formal privacy guarantees; and
    matching the perturbed descriptor set against a second set of descriptors for image feature matching.

2. The method of claim 1, wherein the subset selection mechanism employs a hybrid approach for perturbation, combining real-world descriptors with randomly generated descriptors.

3. The method of claim 1, where the predefined descriptor database is created from a comparatively large public database of images using clustering techniques.

4. The method of claim 1, wherein the LDP protocol includes applying a $\omega$-Subset Mechanism for descriptor perturbation.

5. The method of claim 1, further comprising matching the perturbed descriptor set by computing point-to-subspace and subspace-to-subspace distances.

6. The method of claim 1, further comprising application of adversarial affine subspace embeddings for initial perturbation of the raw image descriptor.

7. The method of claim 1, where the matching includes photometric matching and geometric verification.

8. A system for privacy-preserving image feature matching in computer vision applications, comprising:
    a processor operatively coupled to a non-transitory computer-readable storage medium, the processor configured for:
        perturbing a raw image descriptor using a subset selection mechanism to
        generating a perturbed descriptor set that includes the raw image descriptor and additional descriptors;
        replacing each descriptor in the perturbed descriptor set with its nearest neighbor in a predefined descriptor database to reduce an output domain size of the subset selection mechanism;
        employing local differential privacy (LDP) protocols to further perturb the descriptor set, ensuring formal privacy guarantees; and
        matching the perturbed descriptor set against a second set of descriptors for image feature matching.

9. The system of claim 8, wherein the subset selection mechanism employs a hybrid approach for perturbation, combining real-world descriptors with randomly generated descriptors.

10. The system of claim 8, where the predefined descriptor database is created from a comparatively large public database of images using clustering techniques.

11. The system of claim 8, wherein the LDP protocol includes applying a $\omega$-Subset Mechanism for descriptor perturbation.

12. The system of claim 8, further comprising matching the perturbed descriptor set by computing point-to-subspace and subspace-to-subspace distances.

13. The system of claim 8, further comprising application of adversarial affine subspace embeddings for initial perturbation of the raw image descriptor.

14. The system of claim 8, where the matching includes photometric matching and geometric verification.

15. A computer program product for disentangled data generation, the computer program product comprising a non-transitory computer-readable storage medium having program instructions embodied therewith, the program instructions executable by a computer to cause the computer to perform a method for privacy-preserving image feature matching in computer vision applications, comprising:
    perturbing a raw image descriptor using a subset selection mechanism to
    generate a perturbed descriptor set that includes the raw image descriptor and additional descriptors;
    replacing each descriptor in the perturbed descriptor set with its nearest neighbor
    in a predefined descriptor database to reduce an output domain size of the subset selection mechanism;
    employing local differential privacy (LDP) protocols to further perturb the descriptor set, ensuring formal privacy guarantees; and
    matching the perturbed descriptor set against a second set of descriptors for image feature matching.

16. The computer-readable storage medium of claim 15, wherein the subset selection mechanism employs a hybrid approach for perturbation, combining real-world descriptors with randomly generated descriptors.

17. The computer-readable storage medium of claim 15, where the predefined descriptor database is created from a comparatively large public database of images using clustering techniques.

18. The computer-readable storage medium of claim 15, wherein the LDP protocol includes applying a $\omega$-Subset Mechanism for descriptor perturbation.

19. The computer-readable storage medium of claim 15, further comprising matching the perturbed descriptor set by computing point-to-subspace and subspace-to-subspace distances.

20. The computer-readable storage medium of claim 15, further comprising application of adversarial affine subspace embeddings for initial perturbation of the raw image descriptor.

* * * * *